(12) United States Patent
Chen

(10) Patent No.: US 11,319,035 B2
(45) Date of Patent: May 3, 2022

(54) FLOATING TYPE SOLAR POWER GENERATION EQUIPMENT STAGE DEVICE

(71) Applicant: Sunny Rich Agric. & Biotech Co., Ltd., Taipei (TW)

(72) Inventor: Kuei-Kuang Chen, Taipei (TW)

(73) Assignee: Sunny Rich Agric. & Biotech Co., Ltd., Taipei (TW)

(*) Notice: Subject to any disclaimer, the term of this patent is extended or adjusted under 35 U.S.C. 154(b) by 0 days.

(21) Appl. No.: 16/970,053

(22) PCT Filed: Feb. 26, 2018

(86) PCT No.: PCT/CN2018/077213
§ 371 (c)(1),
(2) Date: Aug. 14, 2020

(87) PCT Pub. No.: WO2019/161561
PCT Pub. Date: Aug. 29, 2019

(65) Prior Publication Data
US 2021/0086874 A1 Mar. 25, 2021

(51) Int. Cl.
*B63B 35/44* (2006.01)
*H02S 10/40* (2014.01)
(Continued)

(52) U.S. Cl.
CPC .............. *B63B 35/44* (2013.01); *B63B 35/00* (2013.01); *B63B 39/00* (2013.01); *B63B 73/40* (2020.01);
(Continued)

(58) Field of Classification Search
CPC ......... B63B 35/44; B63B 73/40; B63B 39/00; B63B 2035/4453; H02S 10/40
See application file for complete search history.

(56) References Cited

U.S. PATENT DOCUMENTS

| 4,714,375 A | * | 12/1987 | Stevenson | ............... B63B 35/50 |
| | | | | 114/262 |
| 4,906,359 A | * | 3/1990 | Cox, Jr. | .................. H02S 20/30 |
| | | | | 210/170.02 |

(Continued)

FOREIGN PATENT DOCUMENTS

| CN | 103573545 A | 2/2014 |
| CN | 106452295 A | 2/2017 |

(Continued)

*Primary Examiner* — S. Joseph Morano
*Assistant Examiner* — Jovon E Hayes
(74) *Attorney, Agent, or Firm* — Karin L. Williams; Alan D. Kamrath; Mayer & Williams PC

(57) ABSTRACT

Provided is a floating type solar power generation equipment stage (10) device, comprising a carrier (1) and a plurality of floating collars (2). The carrier (1) is made of a hard material, and has an outer frame portion (11) in a horizontal direction and a link bar (12) disposed at the center of the outer frame portion (11). Further, the outer frame portion (11) is vertically disposed with a plurality of straight strip-shaped bonding columns (13) downwards, and an adjustment portion (14) for adjusting the buoyancy of the stage is disposed on the carrier (1). Each of the plurality of floating collars (2) is a buoyant hollow ring, and its center has a sleeve hole (114) into which the bonding column (13) can be inserted so that the floating collars (2) can be arranged vertically up and down on the bonding column (13), and the stage (10) can be floated on the water with vertical buoyancy. Moreover, there is a water flow spacing between the vertically arranged floating collars (2), thereby having better floating stability and maintaining ecological functions.

8 Claims, 17 Drawing Sheets

(51) Int. Cl.
  *B63B 73/40* (2020.01)
  *B63B 39/00* (2006.01)
  *B63B 35/00* (2020.01)

(52) U.S. Cl.
  CPC ...... *H02S 10/40* (2014.12); *B63B 2035/4453* (2013.01)

(56) References Cited

U.S. PATENT DOCUMENTS

| | | | | |
|---|---|---|---|---|
| 7,104,730 | B2* | 9/2006 | Leverette | B63B 43/12 |
| | | | | 114/264 |
| 8,056,554 | B2* | 11/2011 | Hinderling | F24S 30/422 |
| | | | | 126/628 |
| 9,712,107 | B2* | 7/2017 | Tung | H02S 20/30 |
| 9,712,108 | B2* | 7/2017 | Kokotov | F24S 25/70 |
| 2008/0029148 | A1* | 2/2008 | Thompson | H02S 20/00 |
| | | | | 136/244 |
| 2015/0214883 | A1* | 7/2015 | Tung | H02S 20/10 |
| | | | | 211/41.1 |
| 2016/0087573 | A1* | 3/2016 | Yang | B63B 3/02 |
| | | | | 136/251 |
| 2017/0040926 | A1* | 2/2017 | Smadja | F24S 20/70 |
| 2018/0016852 | A1* | 1/2018 | von Eberstein | E21B 33/14 |
| 2021/0086874 | A1* | 3/2021 | Chen | B63B 1/107 |

FOREIGN PATENT DOCUMENTS

| | | |
|---|---|---|
| DE | 102013108119 A1 | 8/2014 |
| TW | M419900 U | 1/2012 |
| TW | MS37652 U | 3/2017 |
| TW | M539034 U | 4/2017 |
| WO | WO2014005625 A1 | 1/2014 |

* cited by examiner

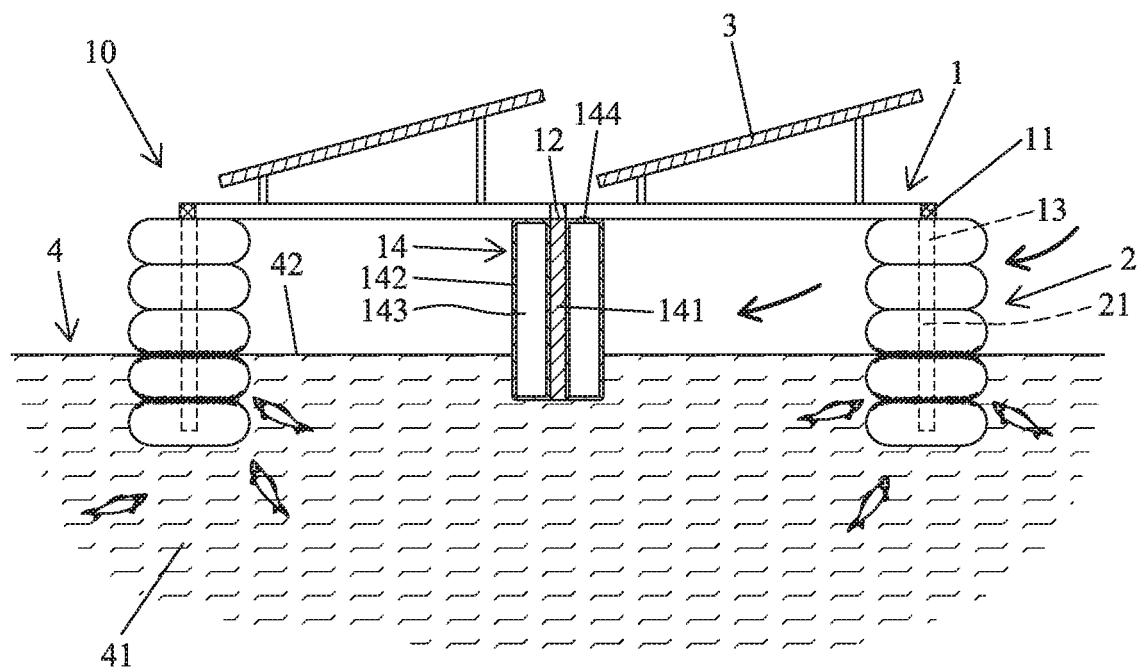
F I G . 3

A - A

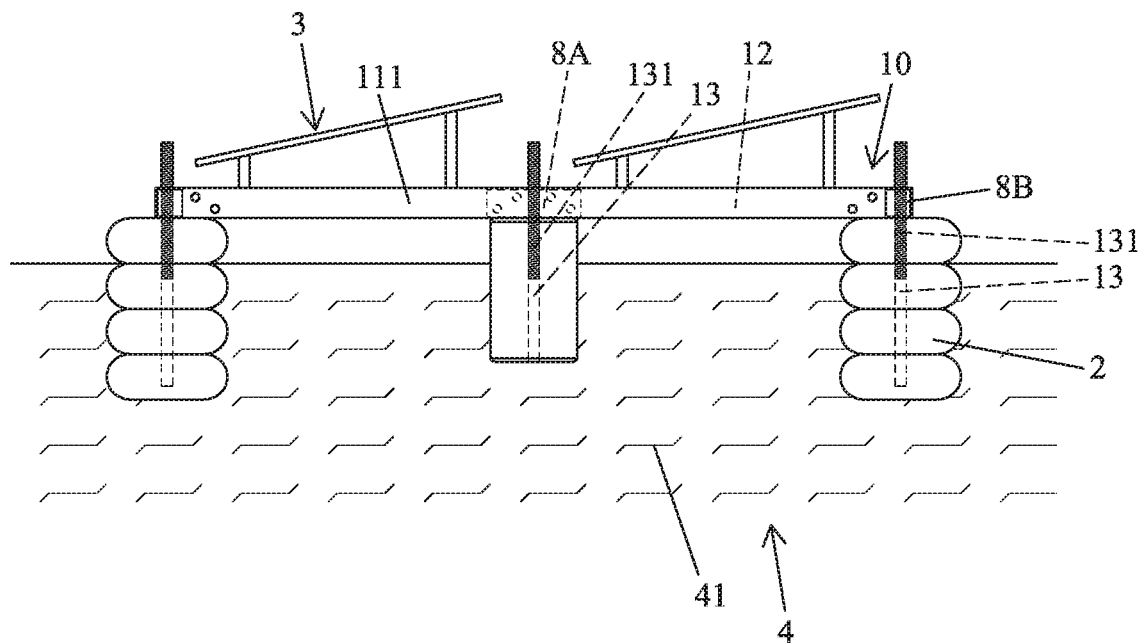
F I G . 17

FLOATING TYPE SOLAR POWER GENERATION EQUIPMENT STAGE DEVICE

TECHNICAL FIELD

The present invention relates to a floating-type platform system for a solar energy generating device that can float on water and that has better stability and economic effect.

BACKGROUND TECHNIC

Solar energy is a green energy industry that reduces pollution. Solar energy generation generally uses solar panels to receive illumination by sunlight and to generate electricity through conversion. Thus, the solar energy generation approach will occupy a light-receiving area. However, the land area is limited, and the costs of land are high, resulting in the drawback of an increase in the costs for solar energy generation.

To increase the light-receiving area, currently there are solar energy generating devices disposed on fish ponds, pools, and lakes. The solar energy generating devices include platforms disposed above water, and the solar panels can be disposed on top of the platforms for illumination by sunlight. There are many types of platforms. For example, a floating-type solar energy generating system of China Taiwan Patent No. TWI545887 includes a plurality of block-shaped floats which can be transversely connected in a cruciform manner, and a supporting frame for mounting the solar energy generating system is disposed on the floats. Furthermore, a floating-type solar panel fixing structure of China Taiwan Utility Model No. TWM537652 includes a plurality of block-shaped floats which can be connected in longitudinal and transverse directions, and solar panels are directly disposed on the floats. Furthermore, a solar panel supporting structure of China Taiwan Utility Model Nos. TWM511603 and TWM539034 includes elongated tubular floats, and a supporting frame and solar panels are disposed on the floats. The above solar energy generating devices can float on water due to the floats and can be illuminated by sunlight for generating power.

Although the above structural designs can use the surface area of water to proceed with solar energy generation, the following drawbacks still exist.

1. The block-shaped or elongated floats must increase the area to provide sufficient buoyancy. However, the large-area floats have a large contact area with the water level and provide low utility, such that the floats per se block a large area of the water level from sunlight and air, reducing the dissolved oxygen and endangering the natural ecology. As a result, although the surface area of the water can be used to generate electricity, the aquaculture is adversely affected.

2. The floats are generally made of rigid HPDE high-density polyethylene with the drawbacks of expensiveness and no resistance to ultraviolet rays. The floats are generally damaged after 5 years of use, which does not fulfill the cost-return demand of the solar energy generating system.

3. Repair of broken floats (into which water enters) is not easy, and maintenance is not convenient.

4. A unit consisting of the above floats has a large overall displacement when subjected to a typhoon or a large wave, adversely affecting the assembly stability of solar panels.

5. The rigid floats will hit the land when water is gone due to drought or other reasons and, thus, directly withstand the weight of the solar panels or frames disposed thereabove, easily causing damage to the floats. Furthermore, the bottom of the pool is generally not a flat surface, which will cause deformation of the floats and the solar panels thereabove under the gravitational force.

Currently there are fixing posts that can be inserted into the bottom of a pool, and a frame and solar panels are disposed on top of the fixing posts to provide a solar energy generating structure. However, this structure cannot be adjusted in response to a change in the water level, such that the spacing between the solar panels/frame and the water level is too large when the water level is low. When strong winds blow upwards from the water level, the solar panels and the frame are apt to be damaged or disengaged. Furthermore, water will immerse the solar panels and the frame and cause damage if the water level is too high. Furthermore, each unit of the structure requires a plurality of fixing posts which must be installed without water, leading to the drawback of inconvenient installation.

BRIEF SUMMARY OF THE INVENTION

An objective of the present invention is to provide an ecofriendly, stable, easy-to-install floating-type platform system for a solar energy generating device.

To this end, the present invention mainly adopts the following technical solutions to achieve the above objective.

A floating-type platform system for a solar energy generating device according to the present invention, with the platform comprising: a platform frame made of rigid material and including an outer frame portion extending horizontally, with the outer frame portion including a center having connecting rods, and with the outer frame portion including a plurality of elongated coupling posts extending vertically downwards therefrom; and a plurality of floats each being an annular hollow member with buoyancy and each including a center having a coupling hole through which a respective coupling post extends, with plural floats mounted on the respective coupling post and arranged in a row in a vertical direction to provide the platform with vertical buoyance to float on water, with the vertical rows of floats having a spacing therebetween to permit flow of water.

Furthermore, the platform frame includes an adjusting portion capable of adjusting buoyancy of the platform.

Furthermore, the adjusting portion is disposed to a location of the connecting rods aligned with the center of the outer frame portion, and the adjusting portion includes a hollow member extending downwards from the connecting rods and including a chamber in a center thereof and a filling port.

Furthermore, the filling port of the adjusting portion can fill a fluid or any object into the chamber, the weight or the buoyance can be increased to adjust the buoyancy of the platform.

Furthermore, the floating-type platform system for the solar energy generating device further comprises at least one connecting frame configured to connect two platforms spaced from each other, with the connecting frame extending horizontally between the two platforms.

Furthermore, the connecting frame includes at least two parallel connecting rods, and each connecting rod includes two ends having connecting portions respectively connected to the outer frame portions of the two platforms.

Furthermore, the outer frame portion of the platform frame is a regular hexagon, the connecting frame includes a regular hexagonal frame portion corresponding to a shape of the outer frame portion of the platform frame and having a center with reinforcing connecting rods, and a side of the frame portion of the connecting frame is coupled to a side of the outer frame portion of a platform frame to form an array structure.

Furthermore, the outer frame portion of the platform frame includes a plurality of transverse beams. Each of the transverse beams and the connecting rods has a coupling hole at each end thereof. Each coupling post includes an upper end having a threading. Each coupler is made of rigid material. Each coupler includes an assembling portion and a plurality of insertion portions extending radially from the assembling portion. The assembling portion has a screw hole extending vertically. Thus, the insertion portions are coupled with the coupling holes of the ends of the beams or the connecting rods, and the screw hole is in threading connection with the coupling post. Thus, better assembling convenience and stability are provided. Furthermore, the outer frame portion of the platform frame according to the present invention have better assembling convenience and reliability.

Furthermore, the couplers are made of metal, and outer surfaces of the insertion portions of each coupler are covered by an outer covering layer of polymer material.

Furthermore, each insertion portion includes positioning grooves recessed therein, and portions of the beams corresponding to the positioning grooves are pressed to couple with the positioning grooves after the coupling holes of the beams or the connecting rods are coupled with the insertion portions.

By using the above technical solutions, the solar energy generating device can be disposed on the platform according to the present invention. The floats according to the present invention can use waste tires, such that wastes can be reused to provide a recycling economic effect. Furthermore, plural floats can be vertically disposed on the same coupling post to provide vertical buoyance, such that the platform frame and the water level have a spacing larger than the spacing provided by transversely arranged conventional floats which provide transverse buoyance. Furthermore, a portion of sunlight can illuminate the water level, and an excellent ventilation effect can be provided above the water level, such that the water has more dissolved oxygen. Thus, the water has a better natural environment and is advantageous to aquaculture.

The floats are assembled by extending a respective coupling post through the coupling holes at the central portions of the floats, which is simple to assemble. In response to the power demand and the surface area of water, the present invention can form an array structure from a plurality of platforms connected by connecting frames. The array structure comprised of a plurality of platforms and a plurality of connecting frames can float on water to significantly increase the stability and resistance to water fluctuation of each platform.

DESCRIPTION OF THE DRAWINGS

FIG. 3 is a diagrammatic view of the first embodiment according to the present invention disposed on water and supporting a solar energy generating device.

FIG. 17 is a diagrammatic view illustrating adjustment of a height of the fourth embodiment according to the present invention on water.

Figure 1:
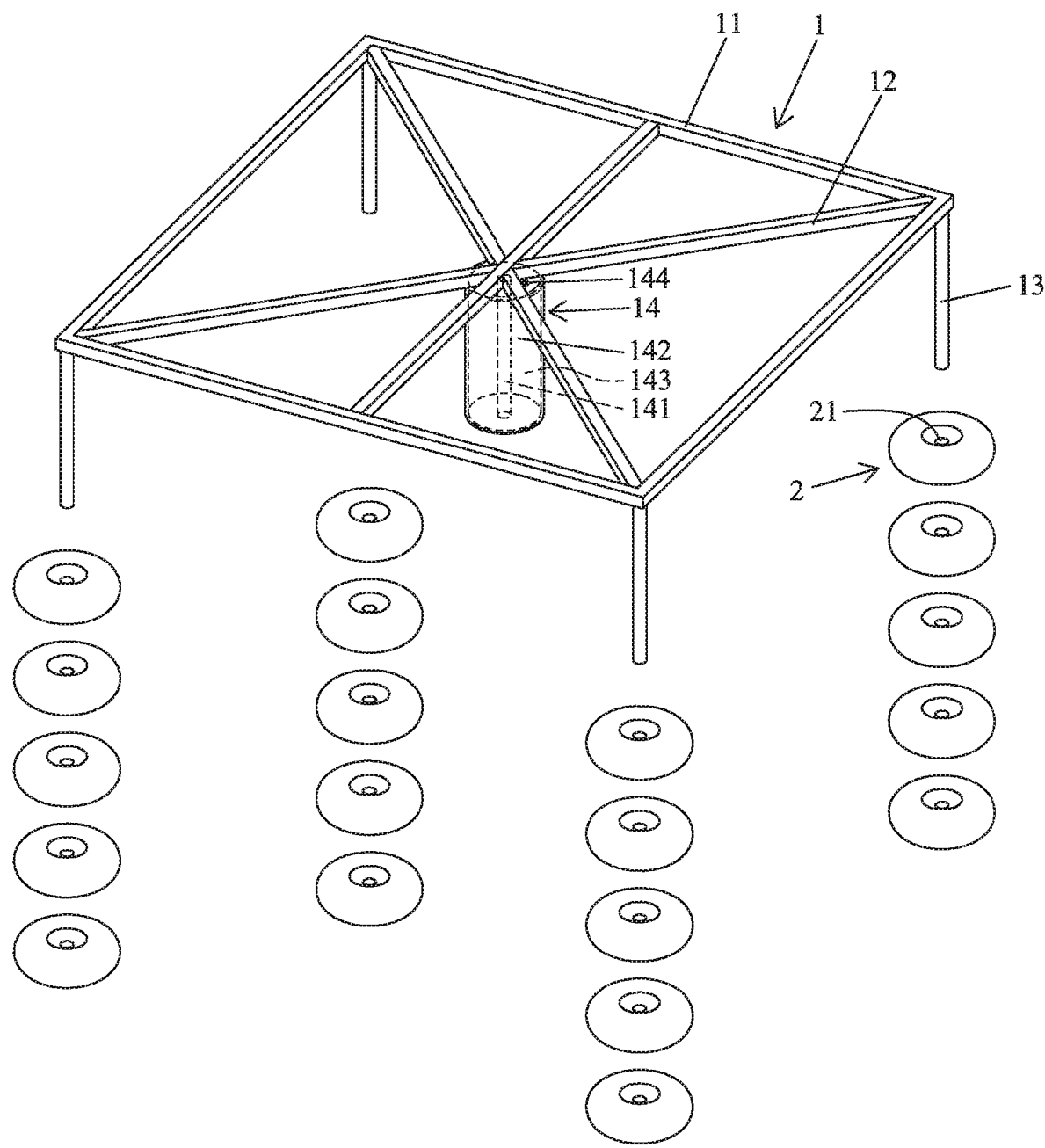
FIG. 1 is an exploded, perspective view of a platform of a first embodiment according to the present invention.

DESCRIPTION OF REFERENCE NUMBERS 10 platform 1 platform frame 11 outer frame portion 111 beam
114 coupling hole 12 connecting rod 121 coupling hole 112 coupling hole
13 coupling post 131 threading 14 adjusting portion 141 column
142 hollow member 143 chamber 144 filling port 145 weight
2 float 21 coupling hole
3 solar energy generating device
4 pool 41 water 42 water level
5 connecting frame 51 connecting rod 511 connecting portion 52 coupling rod
6 net
7 connecting frame 71 frame portion 72 connecting rod 73 coupling rod
8A coupler 81 assembling portion 811 screw hole 82 insertion portion
83 outer covering layer 84 positioning groove 8B coupler

DETAILED DESCRIPTION OF THE INVENTION

Figure 2:
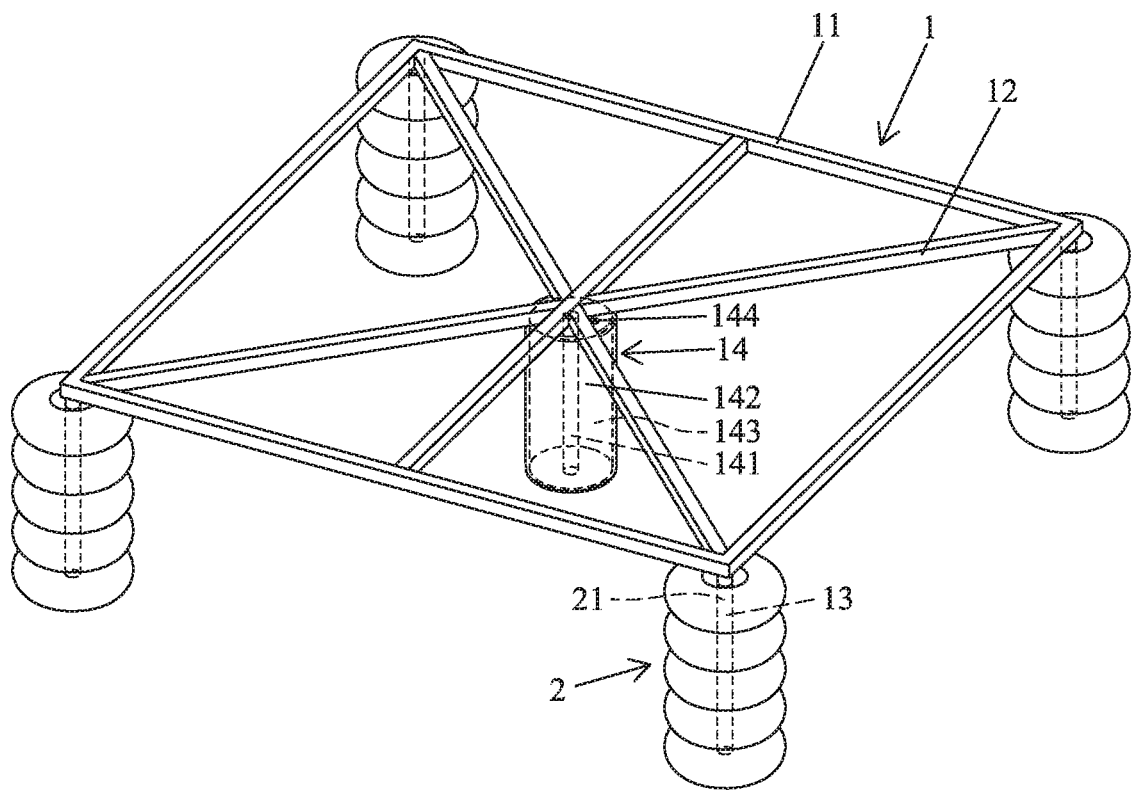
FIG. 2 is a perspective view of the platform of the first embodiment according to the present invention after assembly.

Please refer to FIGS. 1-3. A solar energy generating device 3 can be disposed on a platform 10 of a first embodiment according to the present invention. The platform 10 includes a platform frame 1 and a plurality of floats 2. The platform frame 1 is made of metal or other rigid material and includes an outer frame portion 11 extending horizontally. The outer frame portion 11 includes connecting rods 12 at a center thereof to provide a reinforcing effect and to permit assembly of solar panels 3 and related power generating equipment. Furthermore, the outer frame portion 11 includes four coupling posts 13 extending vertically downwards therefrom. The four coupling posts 13 are uniformly disposed to corners of the outer frame portion 11 at proper spacing. The connecting rods 12 includes an adjusting portion 14 extending downwards from a location corresponding to the center of the outer frame portion 11 for adjusting buoyance. The adjusting portion 14 includes a column 141 extending downwards from the connecting rods 12. A hollow member 142 is mounted around the column 141. The hollow member 142 includes a chamber 143 in a center thereof and a filling port 144. A fluid (such as a gas or water), sand, or other object can be filled into the chamber 143 via the filling port 144.

Each float 2 is an annular hollow member with buoyance and includes a coupling hole 21 in a center thereof for receiving the respective coupling post 13. The floats 2 can be waste rubber tires (such as inner tires of tires of trucks, motorcycles, etc.). Furthermore, a same coupling post 13 can extend through plural floats 2, and the plural floats 2 can align and abut with each other in the vertical direction to provide vertical buoyance. In this embodiment, five floats 2 are disposed on the same coupling post 13 and vertically abut with each other, and a bottom of the bottommost float 2 is lower than a bottom end of the coupling post 13. Furthermore, the vertical rows of floats 2 are spaced from each other by a spacing to permit flow of water 41, avoiding adverse influence on the underwater ecology.

The platform 10 according to the present invention can be designed to have a suitable size and a suitable shape according to needs or the area of a pool 4 (such as a fish pond, a lake). Furthermore, the number and position of the coupling posts 13 can be designed according to the weight of the solar energy generating device 3 disposed thereabove.

The floats 2 according to the present invention can adopt reuse of waste tires, providing a recycling economic effect. The coupling holes 21 of the floats 2 can be extended by the coupling posts 13, which is easy to assemble. Since plural floats 2 are vertically disposed on the same coupling post 13, vertical buoyance is provided by the present invention, such that the spacing between the platform frame 1 and the water level 42 can be larger than the spacing between conventional transversely arranged floats providing transverse buoyance. Furthermore, a portion of sunlight can illuminate the water level 42, and excellent ventilation is provided above the water level 42, such that the water 41 has more dissolved oxygen, as shown in FIG. 3. Furthermore, the water 41 can have a better naturel environment and is advantageous to aquaculture. Furthermore, the coupling posts 13 have a spacing therebetween, such that the vertical rows of floats are spaced from each other by a spacing to permit flow of water 41.

The floats 2 according to the present invention use rubber material which is resistant to weather. The service life is longer than conventional rigid, easy-to-break floats. Furthermore, the present invention adopts a vertical buoyance design which has larger adjustability. The supporting buoyance of the platform 10 can be easily adjusted by adjusting the size or number of the floats 2. Furthermore, the present invention can adjust the height of the platform by filling the adjusting portion 14 of the platform frame 1 with a fluid or other object. As shown in FIG. 3, a lower portion of the adjusting portion 14 is below the water 41 and is filled with a gas via the filling port 144. Larger buoyance is provided when the chamber 143 is filled with the gas, and the platform can be elevated to have a larger spacing to the water level 42 for ventilation purposes.

Figure 4:
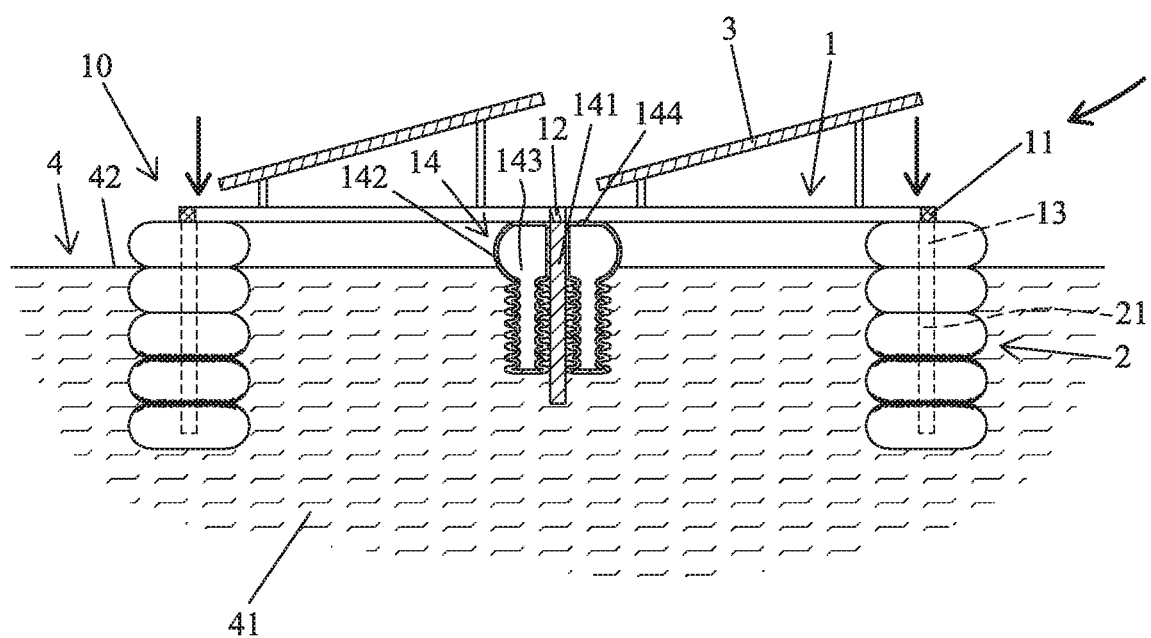
FIG. 4 is a diagrammatic view illustrating descending of the platform of the first embodiment according to the present invention.

Please refer to FIG. 4. When a typhoon is coming, the gas in the chamber 143 of the adjusting portion 14 can be discharged, and the platform 10 is reduced in buoyance to be closer to the water level 42. Thus, the air flow flowing between the platform frame 1 of the platform 10 and the water level 42 can be reduced, avoiding the platform from becoming unstable or even being blown down by strong wind blowing upwards and in gusts.

Figure 5:
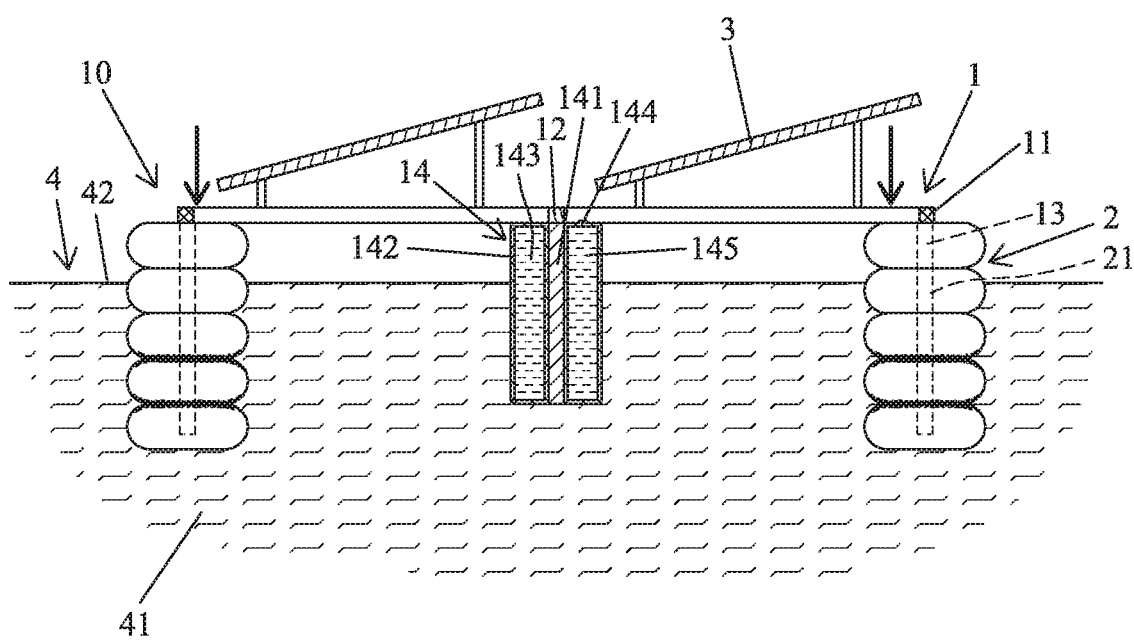
FIG. 5 is another diagrammatic view illustrating descending of the platform of the first embodiment according to the present invention.

In the present invention, the adjusting portion 14 can be used to lower the platform 10 to be closer to the water level 42 when a cold air mass is coming. Thus, the solar energy generating device 3 on the platform 10 can shield from cold. Furthermore, the adjusting portion 14 of the platform 10 according to the present invention can be non-inflation type, and water or other weights can be disposed inside the adjusting portion 14. Therefore, the weight of the platform 10 can be reduced when the chamber 143 of the adjusting member 14 does not receive any heavy object (such as water) and can float above the water level 42 to provide a suitable ventilation spacing to the water level 42. As shown in FIG. 5, a heavy object 145 (such as water) can be filled through the filling port 144 into the chamber 143 to change the weight of the platform 10 while shortening the spacing between the platform 10 and the water level 42. The spacing between the platform 10 and the water level 42 can be easily adjusted by filling a heavy object. The adjusting portion 14 according to the present invention provides a downward pressure whereas the floats 2 provide upward buoyance, permitting more stable adjustment of the height and the floating stability of the platform 10.

Each float 2 according to the present invention under the water can form an artificial reef, as shown in FIG. 3, which is advantageous to growth of algae and various microorganisms in water, assisting in aquaculture and aquatic economy. When water in the pool 4 is gone due to drought, the platform 10 lands by the floats 2 (not shown), with the floats 2 forming a buffering device to provide a soft landing to avoid damage resulting from great vibrations or deformation of the platform and the solar energy generating device.

Figure 6:
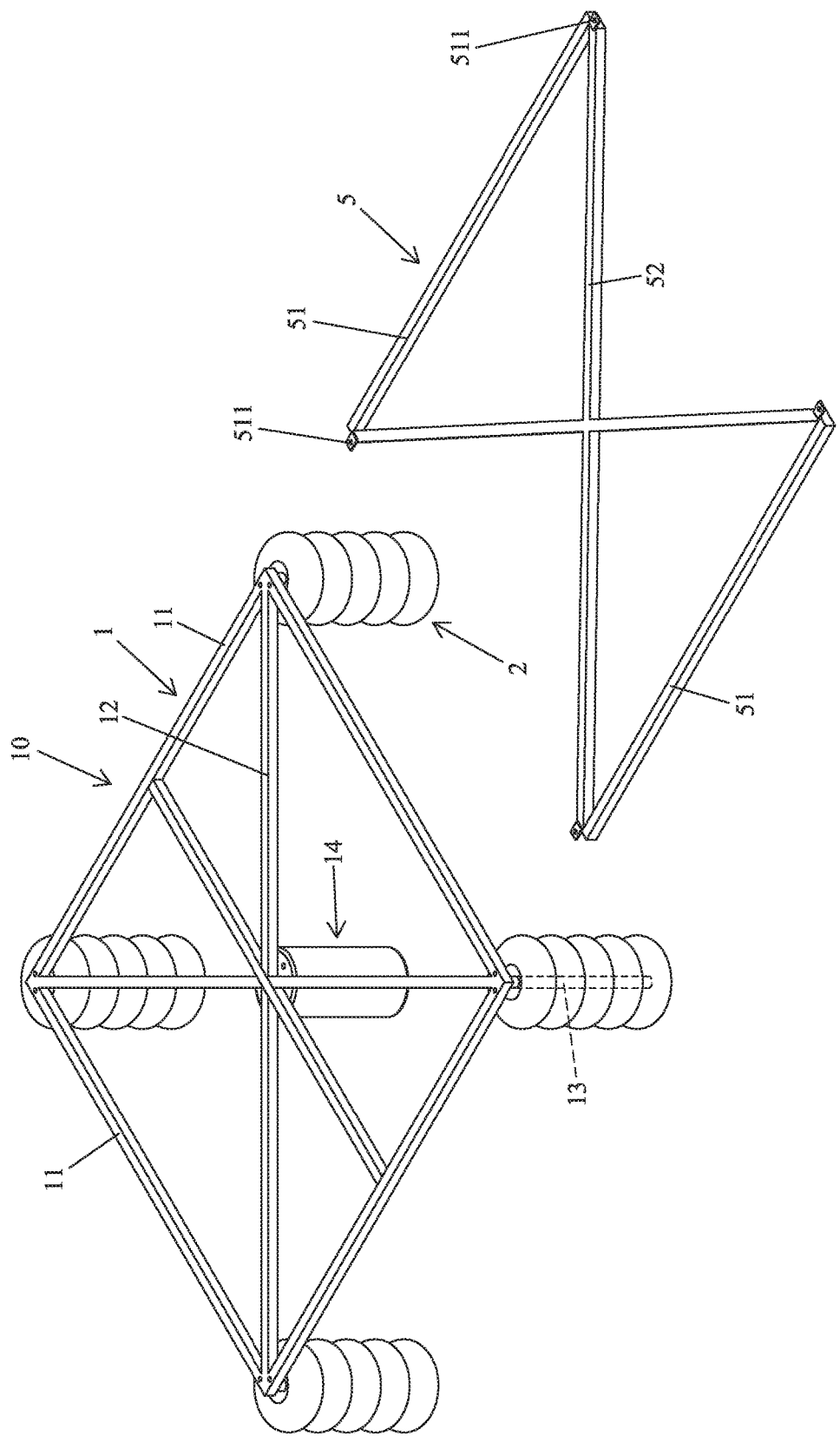
FIG. 6 is an exploded, perspective view of a platform and a connecting frame of a second embodiment according to the present invention.
Figure 7:
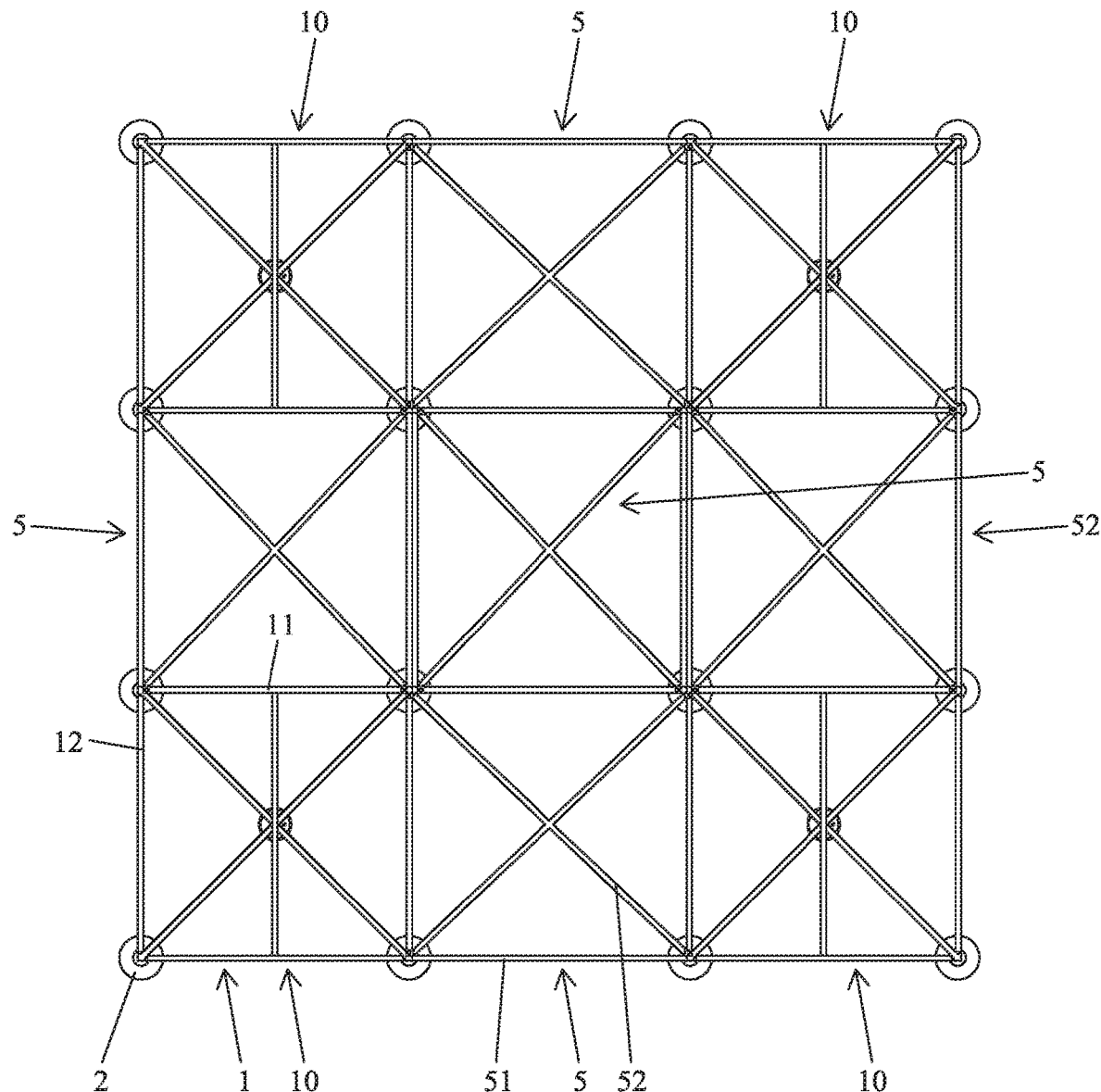
FIG. 7 is a top view of an array comprised of platforms and connecting frames of the second embodiment according to the present invention after assembly.
Figure 8:
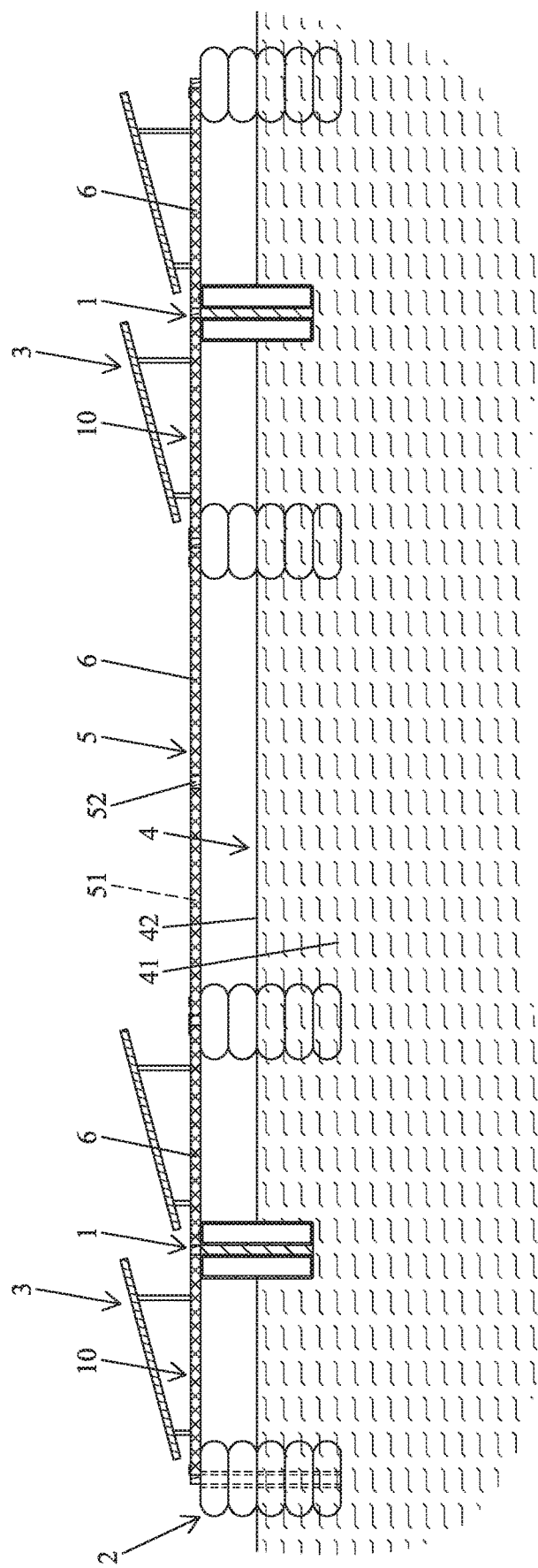
FIG. 8 is a diagrammatic view illustrating the array comprised of the platforms and the connecting frames of the second embodiment according to the present invention disposed on water after assembly.

Please refer to FIGS. 6-8 showing a second embodiment according to the present invention. The second embodiment is similar to the first embodiment. The differences include a plurality of platform systems 10 for supporting solar energy generating devices 3 and a plurality of connecting frames 5. FIG. 7 shows a combination of four platforms 10 and five connecting frames 5. The platform frame 1 of each platform 10 includes a rigid outer frame portion 11 extending horizontally. The outer frame portion 11 of this embodiment is square. Each connecting frame 5 is disposed between two platforms 10 in the horizontal direction to provide connection for two platform systems 10 spaced from each other. Furthermore, each connecting frame 5 has an area approximately the same as a platform 10 and includes two parallel connecting rods 51. Two ends of each connecting rod 51 have connecting portions 511 coupled to the outer frame portions 11 of two platforms 10. A coupling rod 52 is disposed between the two connecting rods 51 to provide a reinforcing effect. Furthermore, the solar energy generating devices (not shown) can be disposed on top of the connecting frames 5.

In response to the power demand and the surface area of water, the present invention can use the connecting frames 5 to couple the plurality of platforms 10 together to form an array structure. A grid-like array structure comprised of the plurality of platforms 10 and the plurality of connecting frames 5 can be constituted to float on the water level 42 to significantly increase the stability and resistance to water fluctuation of each platform 10. In this embodiment, four platforms 10 and five connecting frames 5 are coupled to form an area floating on the water 41, with the area being about 9 times an area of a platform 10, providing stability far better than a single platform 10. Furthermore, a solar energy generating device 3 with solar panels can be disposed on each platform 10.

Please refer to FIG. 8. The present invention further includes a net 6. The net 6 can be disposed transversely on the platform frames 1 of the platforms 10 and the connecting frames 5, such that the net 6 can provide a function of preventing birds from eating aquatics while preventing birds from propagating bacteria that endanger aquatics. Furthermore, the net 6 forms a safety net preventing falling of people standing on the platform frames or the connecting frames for maintaining the solar panel generating devices, thereby increasing safety.

Figure 9:
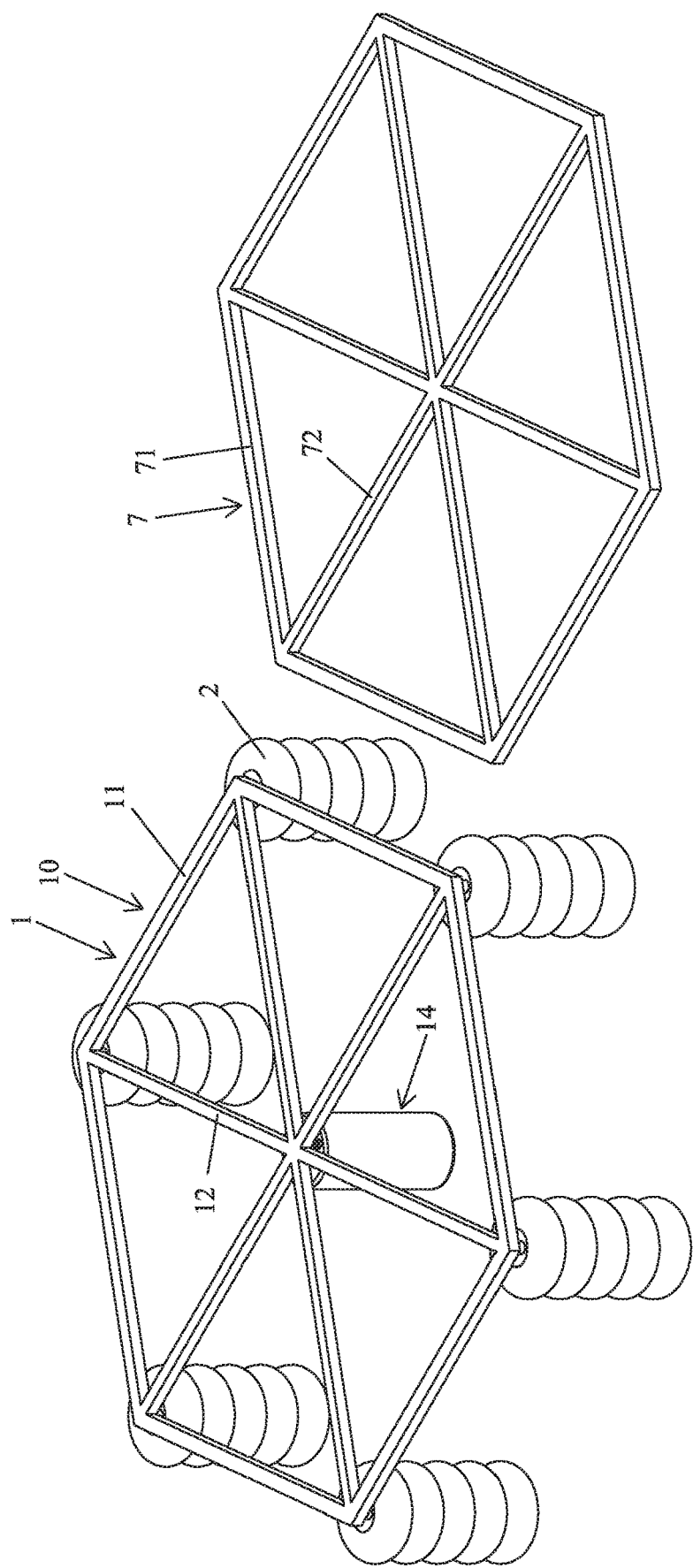
FIG. 9 is an exploded, perspective view of a regular hexagonal platform and a connecting frame of a third embodiment according to the present invention.
Figure 10:
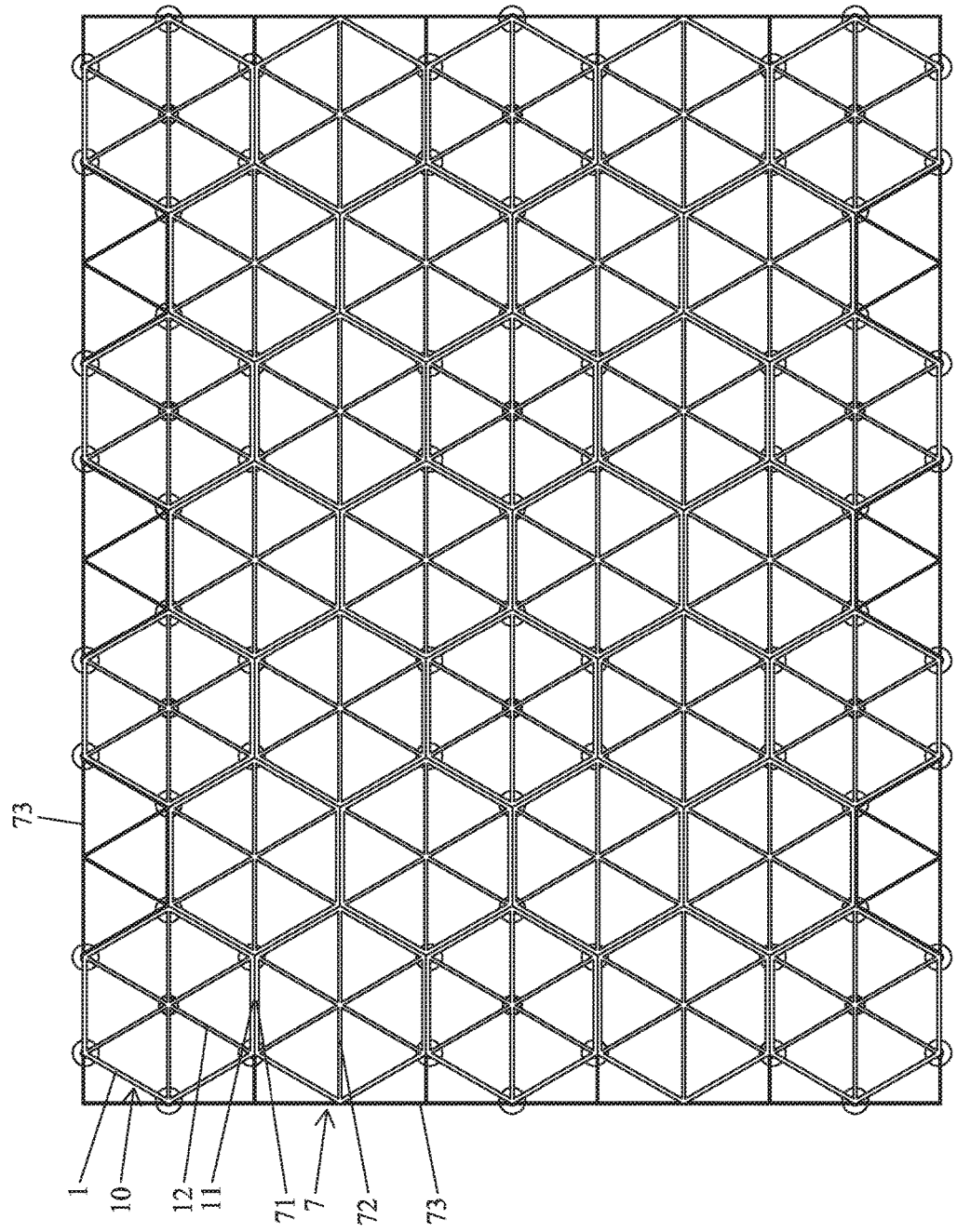
FIG. 10 is a top view illustrating an array comprised of regular hexagonal platforms and connecting frames of the third embodiment according to the present invention after assembly.
Figure 11:
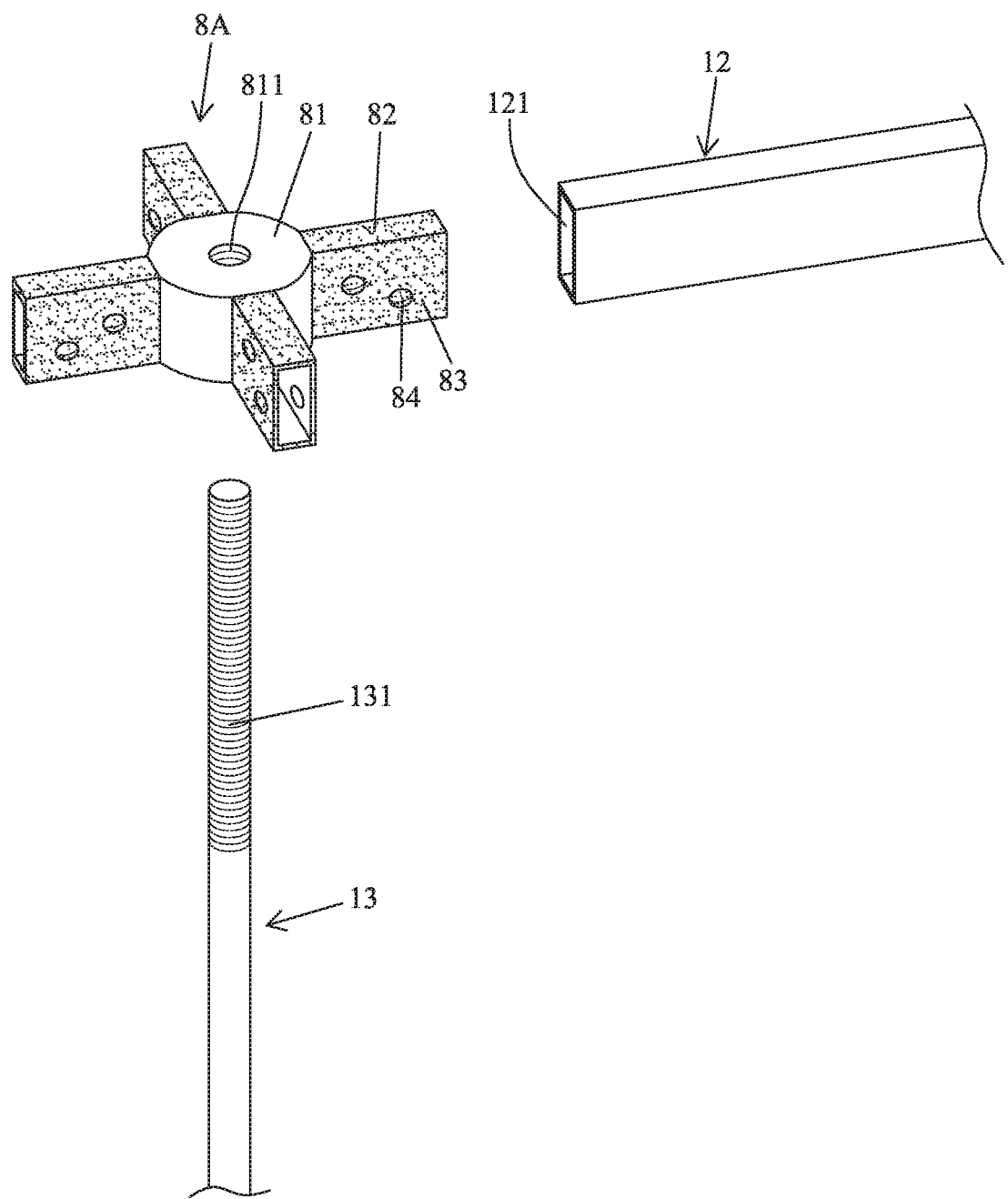
FIG. 11 is a partial, exploded, perspective view of an outer frame portion of a platform frame of a fourth embodiment according to the present invention.

Please refer to FIGS. 9 and 10 showing a third embodiment according to the present invention. The third embodiment is similar to the second embodiment. The difference is that the outer frame portion 11 of the platform frame 1 of the platform 10 is a regular hexagon. The connecting frame 7 includes a regular hexagonal frame portion 71 corresponding to the shape of the outer frame portion 11 of the platform frame 1 of the platform 10 and includes a center having connecting rods 72 for reinforcing purposes. A solar energy generating device (not shown) can also be disposed on the connecting frame 7.

In response to the power demand and the surface area of water, this embodiment can also connect a plurality of platforms 10 by the connecting frames 7. A side of the frame portion 71 of each connecting frame 7 can be fixed to a side of the outer frame portion 11 of a platform 10 by fasteners. Other non-contiguous sides of the frame portion 71 of the connecting frame 7 can be connected to other sides of the outer frame portions 11 of the platform frames 11 of other platforms 1. Thus, a beehive array structure can be formed by coupling a plurality of platforms 10 and a plurality of connecting frames 7 and can float on the water 41. The beehive design can distribute the load to significantly increase the stability and resistance to water fluctuation of the platforms 10, which is far stable than a single platform 10. Furthermore, as shown in FIG. 10, the present invention further includes a plurality of coupling rods 73. The coupling rods 73 are coupled to a periphery of the array structure, such that the array structure forms a complete cuboid while providing the array with better assembly stability and a sense of quality. Furthermore, maintenance walkways (not shown) can be easily disposed along the periphery.

Please refer to FIGS. 11-17 showing a fourth embodiment according to the present invention. The fourth embodiment shows one of preferred connection patterns of the platform frame similar to that in the first embodiment. The outer frame portion 11 of the platform frame 1 includes a plurality of transverse beams 111. Each of the transverse beams 111 and the connecting rods 12 has a coupling hole 112, 121 at each end thereof. A plurality of couplers 8A, 8B is provided. Furthermore, each coupling post 13 includes an upper end having a threading 131. In this embodiment, the coupler 8A is used to couple with the respective coupling post 13 and the connecting rods 12. The coupler 8B is used to couple with the transverse beams 111, the connecting rods 12, and the respective coupling post 13. Each coupler 8A, 8B can be made of metal and includes an assembling portion 81 and four insertion portions 82 radially extending outwards from the assembling portion 81. The assembling portion 81 includes a vertically extending screw hole 811. Each insertion portion 82 of the coupler 8A of this embodiment has rectangular cross sections and includes outer surfaces covered by an outer covering layer 83 of a polymer material. Furthermore, each insertion portion 82 has positioning grooves 84 recessed therein.

Figure 12:
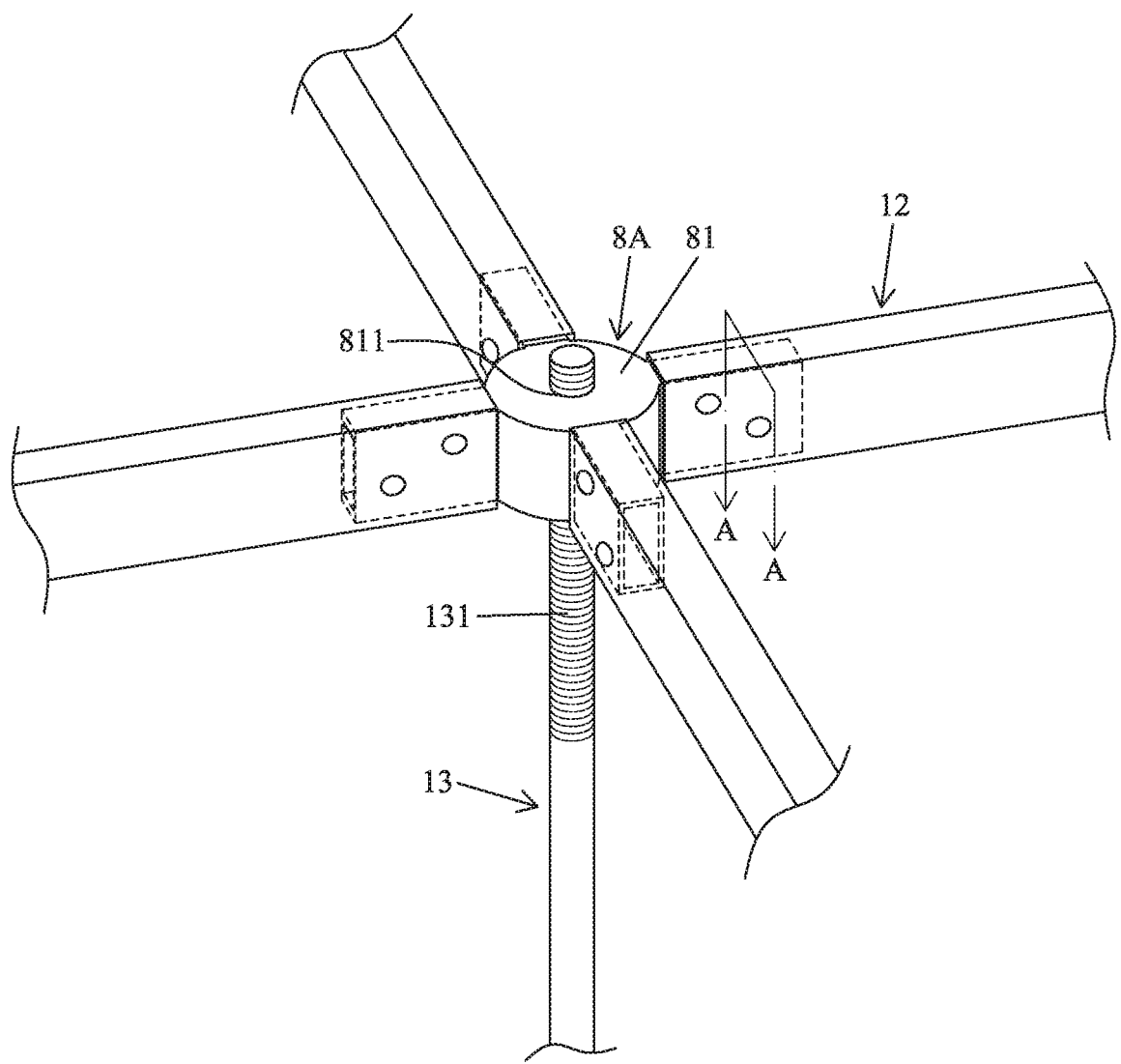
FIG. 12 is a partial, perspective view of the outer frame portion of the platform frame of the fourth embodiment according to the present invention after assembly.
Figure 13:
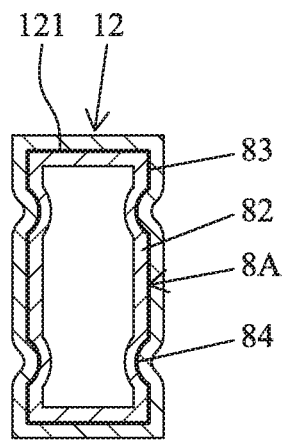
FIG. 13 is a cross sectional view taken along section line A-A of FIG. 11 of the fourth embodiment according to the present invention.
Figure 14:
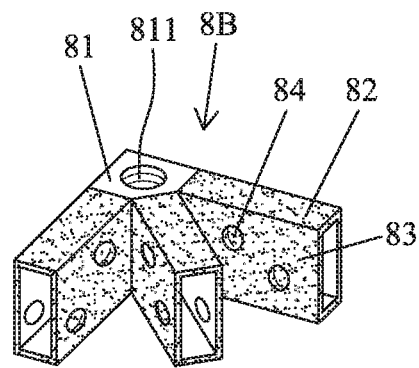
FIG. 14 is a perspective view of another coupler of the fourth embodiment according to the present invention.
Figure 15:
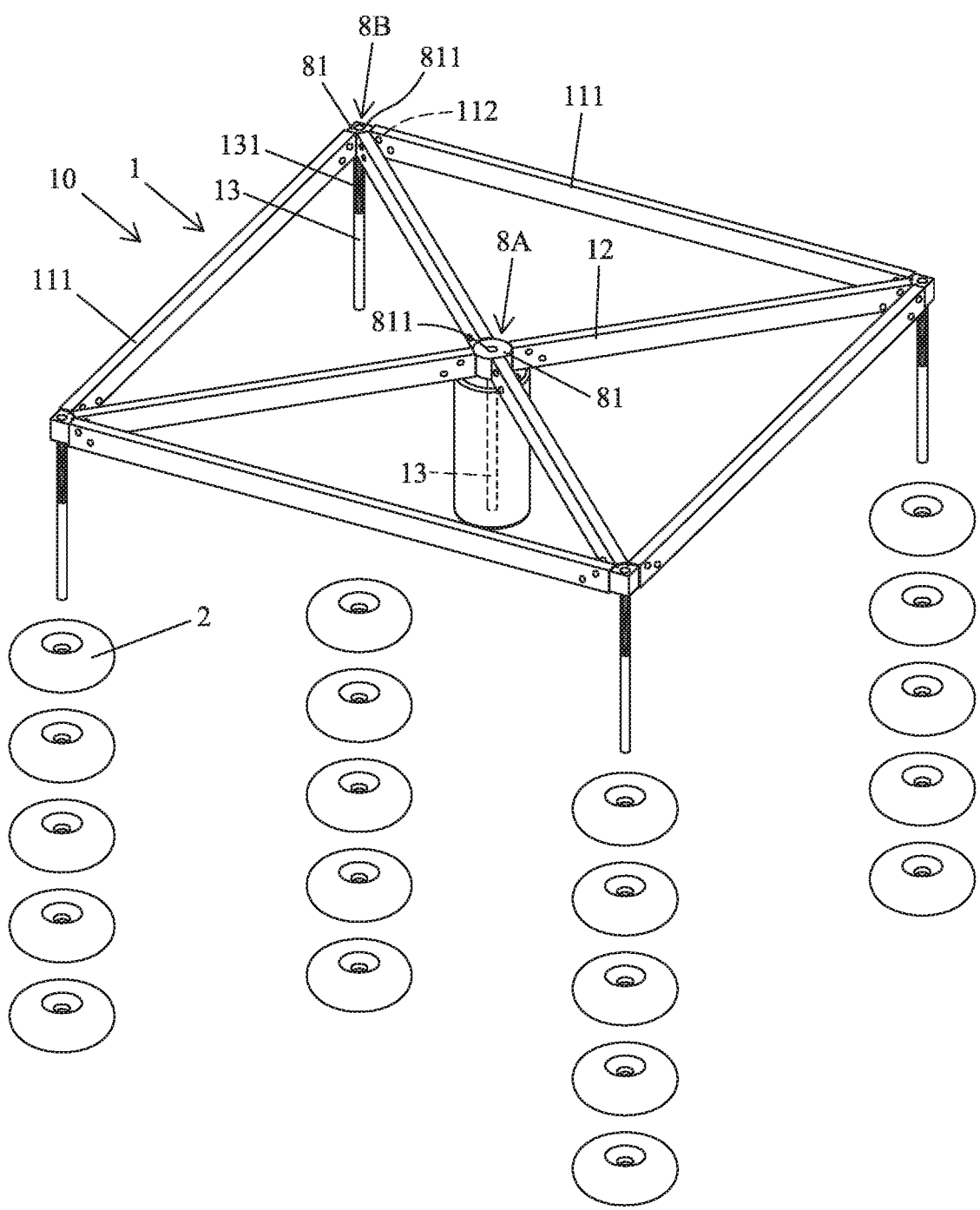
FIG. 15 is a diagrammatic view illustrating a platform frame coupled with floats of the fourth embodiment according to the present invention.

The screw hole 811 of the coupler 8A, 8B is coupled with the threading 131 of the respective coupling post 13, and the assembled height of the respective coupling post 13 and the coupler 8A, 8B can be adjusted. The coupling holes 112, 121 of the beams 111 and the connecting rods 12 can be coupled with the insertion portions 82 of the couplers 8B and 8A, respectively. As shown in FIGS. 12 and 13, the coupling holes 121 can be coupled with the insertion portions 82 of the coupler 8A, and the outer covering layers 83 of the polymer material provide improved assembly sealing effect. Furthermore, the outer covering layers 83 can avoid rapid corrosion caused by a potential difference resulting from direct contact between the metal connecting rods 12 and the metal coupler 8A. Furthermore, a hydraulic tool or other tool can be used in the present invention to press portions (corresponding to the positioning grooves 84) of the connecting rods 12 into the positioning grooves 84 to reliably prevent the connecting rods 12 from disengaging from the coupler 8A, thereby providing improved assembling stability. Furthermore, the above structure does not require drilling for forming assembling holes, preventing corrosion and damage at the assembling holes.

Figure 16:
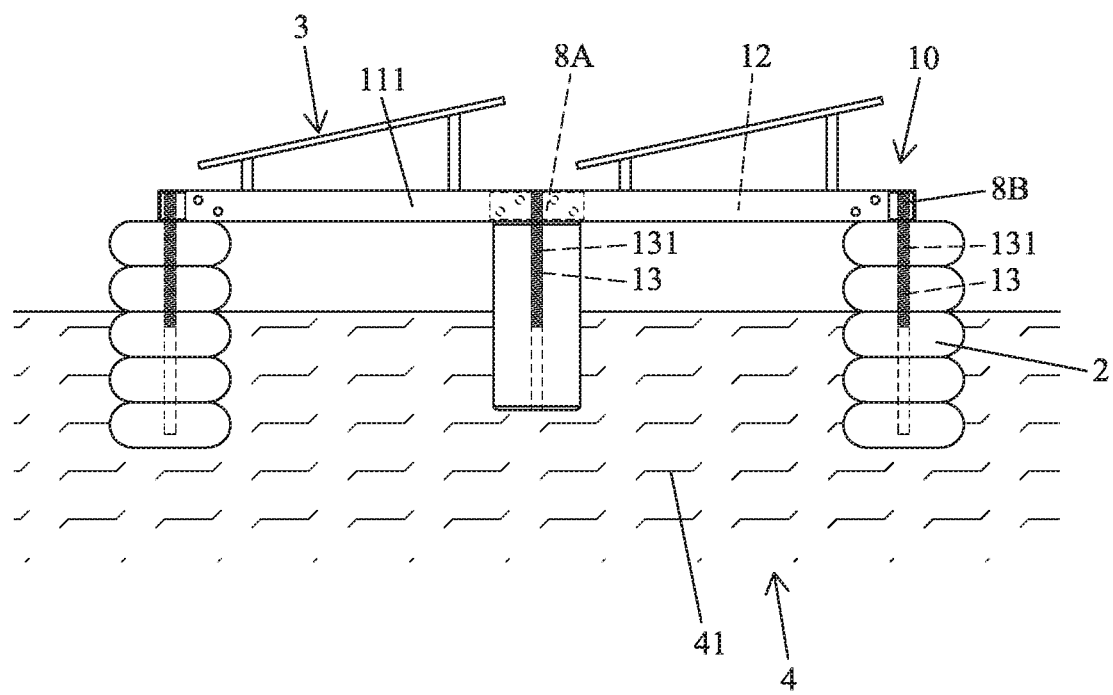
FIG. 16 is a diagrammatic view illustrating disposition of the fourth embodiment according to the present invention on water.

Please refer to FIGS. 16 and 17. The solar energy generating devices 3 are disposed on the platforms 10 according to the present invention, and the assembled height of each coupling post 13 and the associated coupler 8A, 8B can be adjusted to provide better assembly applications.

In view of the foregoing, the present invention can improve the floating-type platform system for the solar energy generating device to have better floating stability and applications. The above embodiments are merely examples of the present invention and are not intended to restrict the present invention. All equivalent changes made within the spirit of the present invention are still within the scope of the invention.

Although specific embodiments have been illustrated and described, numerous modifications and variations are still possible without departing from the scope of the invention. The scope of the invention is limited by the accompanying claims.

The invention claimed is:

1. A floating platform system for the solar energy generating device, comprising:

a platform frame made of rigid material and including an outer frame portion extending horizontally, with the outer frame portion including a center having connecting rods, and with the outer frame portion including a plurality of elongated coupling posts extending vertically downwards therefrom;

a plurality of floats each being an annular hollow member with buoyance and each including a center having a coupling hole through which a respective coupling post extends, with plural floats mounted on the respective coupling post and arranged in a row in a vertical direction to provide the platform with vertical buoyance to float on water, with the vertical rows of floats having a spacing therebetween to permit flow of water; and at least one connecting frame configured to connect two platforms spaced from each other, with the connecting frame extending horizontally between the two platforms, wherein the outer frame portion of the platform frame is a regular hexagon, the at least one connecting frame includes a regular hexagonal frame portion corresponding to a shape of the outer frame portion of the platform frame and having a center with reinforcing connecting rods, and a side of the outer frame portion of the connecting frame is coupled to a side of the outer frame portion of a platform frame to form an array structure.

2. A floating platform system for the solar energy generating device comprising:

a platform frame made of rigid material and including an outer frame portion extending horizontally, with the outer frame portion including a center having connecting rods, and with the outer frame portion including a plurality of elongated coupling posts extending vertically downwards therefrom; and a plurality of floats each being an annular hollow member with buoyance and each including a center having a coupling hole through which a respective coupling post extends, with plural floats mounted on the respective coupling post and arranged in a row in a vertical direction to provide the platform with vertical buoyance to float on water, with the vertical rows of floats having a spacing therebetween to permit flow of water, wherein the outer frame portion of the platform frame includes a plurality of transverse beams, each of the transverse beams and the connecting rods has a coupling hole at each end thereof, each coupling post includes an upper end having a threading, each coupler is made of rigid material, each coupler includes an assembling portion and a plurality of insertion portions extending radially from the assembling portion, the assembling portion has a screw hole extending vertically, the insertion portions are coupled with the coupling holes of the ends of the beams or the connecting rods, and the screw hole is in threading connection with the coupling post.

3. The floating platform system for the solar energy generating device as set forth in claim 2, wherein the couplers are made of metal, and outer surfaces of the insertion portions of each coupler are covered by an outer covering layer of polymer material.

4. The platform system for the solar energy generating device as set forth in claim 3, wherein each insertion portion includes positioning grooves recessed therein, and portions of the beams corresponding to the positioning grooves are pressed to couple with the positioning grooves after the coupling holes of the beams or the connecting rods are coupled with the insertion portions.

5. The floating platform system for the solar energy generating device as set forth in claim 1, wherein the platform frame includes an adjusting portion configured to adjust buoyance of the platform.

6. The floating platform system for the solar energy generating device as set forth in claim 5, wherein the adjusting portion is disposed to a location of the connecting rods aligned with the center of the outer frame portion, the adjusting portion includes a hollow member extending downwards from the connecting rods and including a chamber in a center thereof and a filling port.

7. The floating platform system for the solar energy generating device as set forth in claim 6, wherein the filling port of the adjusting portion is configured to fill a fluid into the chamber.

8. The floating platform system for the solar energy generating device as set forth in claim 1, wherein the connecting frame includes at least two parallel connecting rods, and each connecting rod includes two ends having connecting portions respectively connected to the outer frame portions of the two platforms.

* * * * *